(12) United States Patent  
Sano et al.

(10) Patent No.: US 7,499,194 B2
(45) Date of Patent: Mar. 3, 2009

(54) DATA CONVERTER AND DATA CONVERSION PROGRAM STORAGE MEDIUM

(75) Inventors: Tetsuya Sano, Kanagawa (JP); Mitsuru Nakao, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 740 days.

(21) Appl. No.: 11/039,862

(22) Filed: Jan. 24, 2005

(65) Prior Publication Data

US 2005/0162692 A1 Jul. 28, 2005

(30) Foreign Application Priority Data

Jan. 23, 2004 (JP) ............................. 2004-015779

(51) Int. Cl.
*G06T 11/60* (2006.01)

(52) U.S. Cl. ...................................... 358/1.9

(58) Field of Classification Search .................. 358/1.9, 358/1.1, 1.18, 1.16, 1.15, 529, 500; 369/171, 369/170, 127, 99; 382/249, 248, 232; 375/240.01, 375/240; 348/207.2, 207.99

See application file for complete search history.

(56) References Cited

U.S. PATENT DOCUMENTS 5,983,243 A 11/1999 Heiney et al.
5,995,724 A 11/1999 Mikkelsen et al.
6,134,018 A 10/2000 Dziesietnik et al.
6,426,809 B1 * 7/2002 Hayashi et al. ............. 358/529
2003/0107766 A1 * 6/2003 Ramot et al. ............... 358/1.18
2004/0184528 A1 * 9/2004 Miyasaka et al. ...... 375/240.01
2005/0024498 A1 * 2/2005 Iida et al. ................. 348/207.2

FOREIGN PATENT DOCUMENTS

JP 2001-518417 A 10/2001
JP 2003-316549 A 11/2003
WO WO 99/17539 A1 4/1999

* cited by examiner

*Primary Examiner*—Mark K Zimmerman
*Assistant Examiner*—James A Bonner, Jr.
(74) *Attorney, Agent, or Firm*—Sughrue Mion, PLLC

(57) ABSTRACT

A data converter has a data conversion section that converts image group data representing an image group consisting of plural images into plate data, each piece of plate data representing a plate image, and plural pieces of plate images being overlapped each other to represent each of the images in the image group, a data saving section that saves the plate data produced by the data conversion section, a sharing determination section that determines whether plate data saved by the data saving section can be shared or not before the production of the plate data by the data conversion section is completed, and a data sharing section that, if the sharing determination section determines that plate data can be shared, acquires the plate data from the data saving section while preventing the data conversion section from producing plate data.

8 Claims, 10 Drawing Sheets

| Assembly processing value | Reference information for accessing compressed data |
|---|---|
| 10021···· | C:¥Assembled¥data_001 |
| 22021···· | C:¥Assembled¥data_002 |
| 11022···· | C:¥Assembled¥data_003 |
| 34567···· | C:¥Assembled¥data_004 |
| 00023···· | C:¥Assembled¥data_005 |
| 34568···· | C:¥Assembled¥data_006 |
| 66783···· | C:¥Assembled¥data_007 |
| 55678···· | C:¥Assembled¥data_008 |
| ···· | ···· |

Fig. 10

DATA CONVERTER AND DATA CONVERSION PROGRAM STORAGE MEDIUM

BACKGROUND OF THE INVENTION

1. Field of the Invention

The present invention relates to a data converter that converts image data into image data in a data format suitable for an output device, and a data conversion program storage medium that stores a data conversion program that makes a computer to perform such image data conversion.

2. Description of the Related Art

In recent years, computerization of printing technology has been advanced, and desktop publishing (DTP) for editing pages of prints on a computer has become popular. Typical kinds of DTP software used by operators to edit pages use page description languages (PDL), such as post script (PS) and portable document format (PDF), to describe pages. The DTP software produces image data that represents an image of a page with the positions of the elements, such as characters and photographs, fixed. The image data produced by the DTP software contains element data sections that represent the individual elements in the page and descriptions of the positions of the elements arranged in the page.

In production of plural pieces of direct mail or the like addressed to different destinations, for example, variable printing is often utilized. In the variable printing, image data is edited for output in such a manner that plural pages are described by handling plural pieces of direct mail as one printing group, an element data section that describes a master element, such as a stamp mark and an illustration, which commonly appears in plural pages, is shared among the plural pages, and an element data section that describes a variable element, such as an address and personalized information, which differs among pages, is replaced with an appropriate one for each page. In recent years, a page description language (PDL) referred to as a personal print markup language (PPML), which enables efficient edit of pages in variable printing, has become widely known (see Japanese Patent Laid-Open No. 2003-316549). Such a PPML permits previous declaration that the master element is shared among plural pages. When describing pages to be variable-printed in the PS or PDF, any master element commonly appearing in plural pages has to be described for each page. However, if the PPML is used, any master element has to be described just one time when the master element appears for the first time, and the master element once described can be utilized again when the same master element appears in another page. Therefore, the PPML can allow simple description of an easily legible page and reduce the total amount of image data.

If such variable printing is performed by a conventional printing machine that transfers ink applied to a printing plate onto a sheet of paper, many printing plates prepared for each address or personalized information are wasted. Therefore, instead of such a printing machine, there is used a printer-type output device that directly outputs characters or images onto a sheet of paper based on image data. However, such an output device, such as a printer, cannot output image data described in the PS, PDF, PPML or the like that is produced by DTP software as it is. Therefore, there have been known a data converter that converts image data into image data in a data format suitable for the output device through a raster image processor (RIP) processing that converts an element described in the PS into a raster image, an assembly processing that arranges the raster image converted from the element in a page, and the like, and a data conversion program that makes a computer perform such conversion (see National Publication of International Patent Application No. 2001-518417 (FIG. 2), for example).

However, many output devices for producing prints that replace printing machines are of a type that represents numerous colors by overlapping plural basic colors (for example, four colors of cyan (C), magenta (M), yellow (Y) and black (K)) as with the printing machines. In general, such output devices require, as image data, plural pieces of plate data that represent plural color-separated images, which result from separation of an image into images of the basic colors. Thus, the data converter is required to produce the plural pieces of plate data, and in the variable printing, such plural pieces of plate data have to be successively produced at a rate beyond the output capability of the output device. However, there are problems that the processing load is too heavy for the conventional data converter and the production of plate data is too slow for the output device having a high output capability.

SUMMARY OF THE INVENTION

The present invention has been made in view of the above circumstances and provides a data converter that can rapidly produce plural pieces of plate data with a reduced processing load and a data conversion program storage medium that stores a data conversion program that makes a computer perform such production of plural pieces of plate data.

The present invention provides a data converter that converts image group data representing an image group consisting of a plurality of images into image data in a data format suitable for a predetermined output device that outputs an image, including:

a data conversion section that produces plate data in the data format by converting the image group data into the plate data, each piece of plate data representing a plate image, and a plurality of pieces of plate images being overlapped each other to represent each of the images in the image group represented by the image group data;

a data saving section that saves the plate data produced by the data conversion section;

a sharing determination section that determines whether plate data saved by the data saving section can be shared or not before the production of the plate data by the data conversion section is completed; and a data sharing section that, if the sharing determination section determines that plate data can be shared, acquires the plate data from the data saving section while preventing the data conversion section from producing plate data.

Typically, in the data converter, the data conversion section produces plate data through a plurality of data conversion steps, and the sharing determination section determines whether plate data can be shared or not when at least the last one of the plurality of data conversion steps has not been conducted.

When performing the variable printing using an output device that requires plural pieces of plate data, even if pages of prints totally differ from each other, if plate data can be shared among the pages, the data converter according to the present invention can permit sharing of the plate data and, thus, omit the production of the plate data. As a result, the processing load of the plate data production is reduced, and, as a whole, plate data can be rapidly produced in the production of a series of prints.

Preferably, in the data converter according to the present invention, the image group data represents an image group that constitutes a plurality of versions of prints having a common part.

For example, the plate data sharing described above is effective in particular in data conversion of image group data representing an image group of plural versions of prints, such as plural pieces of direct mail addressed to different destinations, because replacement of a component, such as an address, is likely to affect only particular plate data.

In addition, the present invention provides a data conversion program storage medium that stores a data conversion program that is incorporated in a computer and makes the computer convert image group data representing an image group consisting of a plurality of images into image data in a data format suitable for a predetermined output device that outputs an image, the data conversion program implementing on the computer:

a data conversion section that produces plate data in the data format by converting the image group data into the plate data, each piece of plate data representing a plate image, and a plurality of pieces of plate images being overlapped each other to represent each of the images in the image group represented by the image group data;

a data saving section that saves the plate data produced by the data conversion section;

a sharing determination section that determines whether plate data saved by the data saving section can be shared or not before the production of the plate data by the data conversion section is completed; and a data sharing section that, if the sharing determination section determines that plate data can be shared, acquires the plate data from the data saving section while preventing the data conversion section from producing plate data.

The data conversion program according to the present invention allows a computer to readily implement each component of the data converter according to the present invention.

As for the data conversion program according to the present invention, only a basic form thereof is described in this specification. However, this is merely intended to avoid redundancy, and the data conversion program according to the present invention can have various forms corresponding to various forms of the data converter described above, besides the basic form described herein.

As described above, the data converter and the data conversion program storage medium storing the data conversion program according to the present invention allow rapid production of plural pieces of plate data with a reduced processing load.

BRIEF DESCRIPTION OF THE DRAWINGS

FIG. 10 shows a component assembly information table.

DETAILED DESCRIPTION OF THE INVENTION

Embodiments of the present invention will be described with reference to the drawings.

Figure 1:
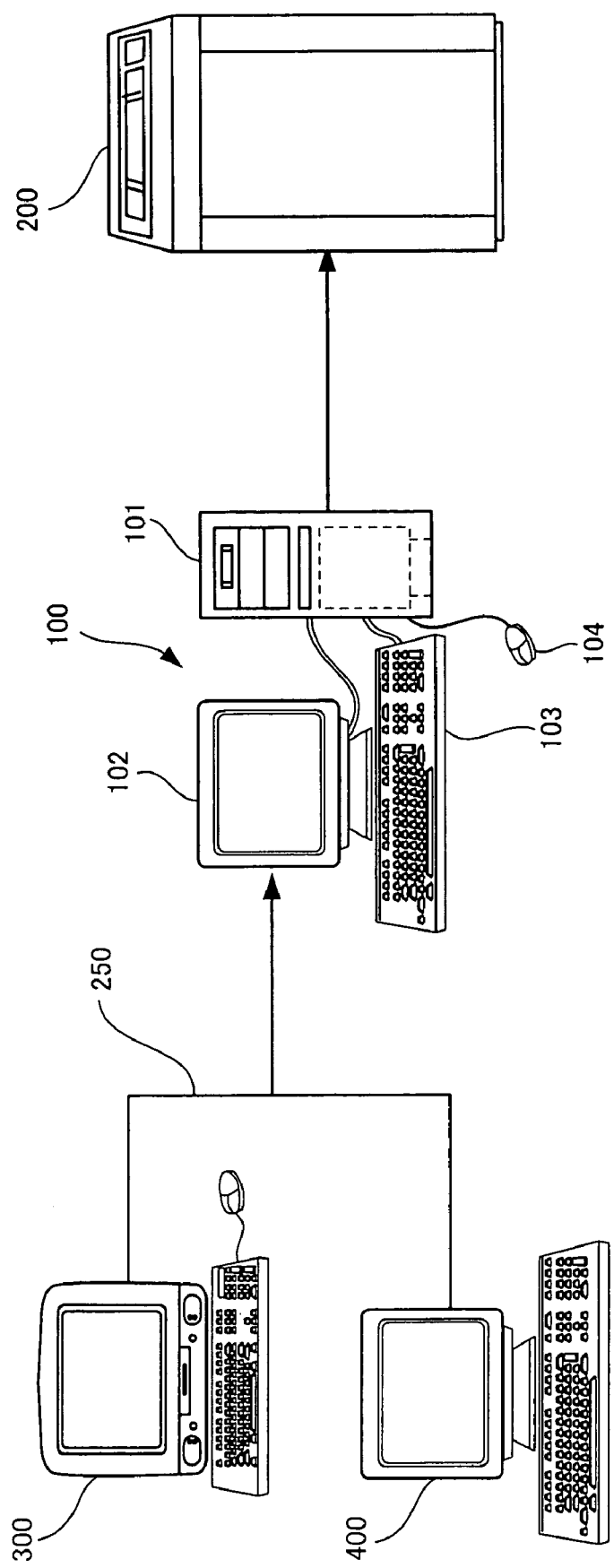
FIG. 1 shows a printing system incorporating an embodiment of the present invention.

FIG. 1 shows a printing system incorporating an embodiment of the present invention.

The printing system shown in FIG. 1 has a computer that serves as a data converter 100, which is an embodiment of the present invention, and a printer 200, which is an example of an output device referred to in this specification. The printer 200, which is a printer for producing a print, has a high precision for ensuring a desired print quality and a high output speed ready for production of a large amount of prints.

To the data converter 100, computers serving as editors 300 and 400 are connected via a communication network 250. The editors 300 and 400 edit image data that represents components of a print in a page description language and transmit the edited image data to the data converter 100 via the communication network 250.

Upon receiving the image data from the editor 300 or 400, the data converter 100 converts the image data into image data that represents an image by overlaid raster images of four colors C, M, Y and K so that the printer 200 can handle the image data and outputs the resulting image data to the printer 200. Here, the data converter may receive the image data via a recording medium, such as a compact disk recordable (CD-R) and a magneto-optical (MO) disk, rather than via the communication network 250.

The printer 200 outputs an image represented by the image data using four color materials of C, M, Y and K. Once the printer 200 receives the image data representing four raster images of C, M, Y and K, which is obtained by the conversion by the data converter 100, the printer 200 reproduces the four raster images of C, M, Y and K using the four color materials of C, M, Y and K, overlays the reproduced images and outputs the resulting image. Here, the printer 200 according to this embodiment receives four, C, M, Y and K, raster images of a continuous-tone (contone) component, such as a photograph or illustration, and four, C, M, Y and K, raster images of a line-work component, such as a character or rule, so that the printer 200 outputs one image using eight raster images in total.

The page description language used by the editors 300 and 400 discriminates between the continuous-tone components and the line-work components. Such discrimination between the components makes it easy to reedit the image data after checking the finished image or to replace a component with another in the variable printing described above.

Here, the editors 300 and 400 has a capability of editing plural versions of prints for variable printing and producing image group data that represents the plural versions of prints as one group. In the following, a case where such image group data is transmitted to the data converter 100 of the printing system will be described.

Figure 2:
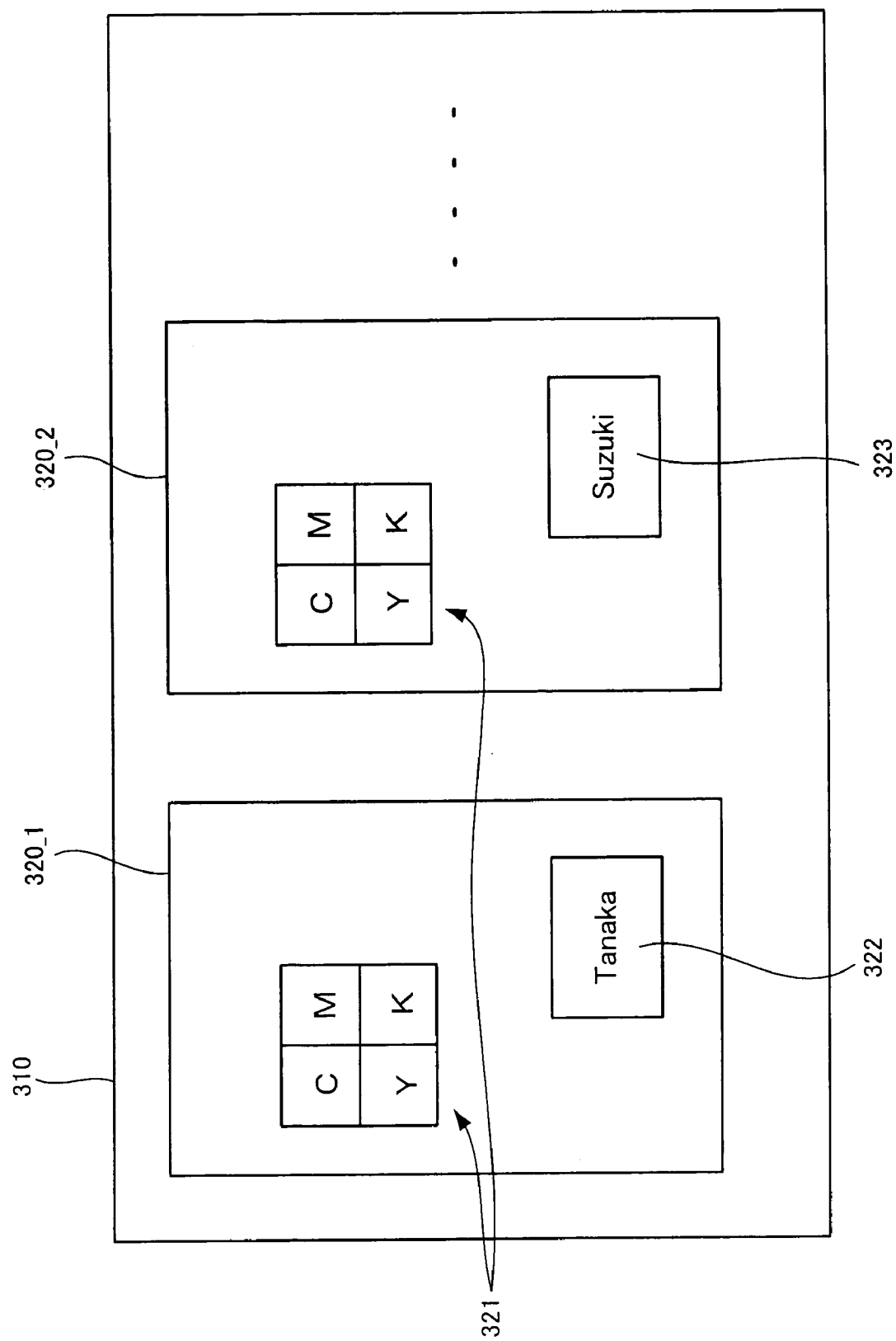
FIG. 2 is a conceptual diagram showing plural versions of prints represented by image group data.

FIG. 2 is a conceptual diagram showing plural versions of prints represented by image group data.

Here, for convenience of explanation, it is assumed that each print is constituted by one page of image.

Image group data 310 represents plural versions of prints 320_1, 320_2, . . . in a page description language (PDL). The prints 320_1, 320_2, . . . are each represented as a set of components 321, 322, 323, . . . arranged in the page. The three components 321, 322 and 323 shown in FIG. 2 can be classified into continuous-tone components and line-work components. That is, the first component 321 is classified as a continuous-tone component, and the second and third components 322 and 323 are classified as line-work components.

Besides such classification into continuous-tone components and line-work components, the components 321, 322, 323, . . . represented by the image group data 310 are further classified into master components and variable components, depending on how they are used in the prints 320_1, 320_2, . . . . The master components are those declared in the image group data 310 to be used in plural pages (prints, in this example), and the first component 321 shown in FIG. 2 is an example of the master components. On the other hand, the variable components are those declared in the image group data 310 to be used only in one page, and the second and third components 322 and 323 are examples of the variable components. Such declaration is made for component management. Thus, the components declared master components are managed with a common ID number in the data converter, and the components declared variable components are managed with different ID numbers in the data converter. Therefore, the declarations in the image group data 310 do not always agree with the contents of the actual prints 320_1, 320_2, . . . , and, when there are many prints, for example, the same component as that declared a variable component may happen to appear in plural prints. Even in such a case, the component is handled as different components in terms of management.

Having received the image group data 310 representing such plural versions of prints 320_1, 320_2, . . . at the data converter 100 shown in FIG. 1, the printing system can output the versions of prints from the printer 200. Such output of prints is an example of the variable printing described above. Here, the data converter 100 and the printing system handle the whole of the plural versions of prints 320_1, 320_2, . . . represented by the image group data 310 as one output object (that is, one job).

A characteristic of the printing system as one embodiment of the present invention lies in the operation of the computer serving as the data converter 100. Therefore, in the following, the data converter 100 will be described in particular.

The data converter 100 shown in FIG. 1 is constituted by a computer as described above, and the computer has a main unit 101 incorporating a CPU, a main storage device, a hard disk, a communication board and the like, a CRT display 102 that displays an image or a character string on a display screen in response to an instruction from the main unit 101, a keyboard 103 for a user to enter an instruction or text information to the computer, and a mouse 104 that points at an icon or the like displayed at any point in the display screen of the CRT display 102 for entering the instruction assigned to the icon or the like.

The main unit 101 incorporates a CD-ROM drive that reproduces information stored in a CD-ROM 105 (not shown in FIG. 1, see FIG. 3) or CD-R that is removably loaded thereto. In addition, the main unit 101 incorporates an MO drive that records information on or reproduces information in a magneto-optical (MO) disk 106 (not shown in FIG. 1, see FIG. 3) that is removably loaded thereto.

Figure 3:
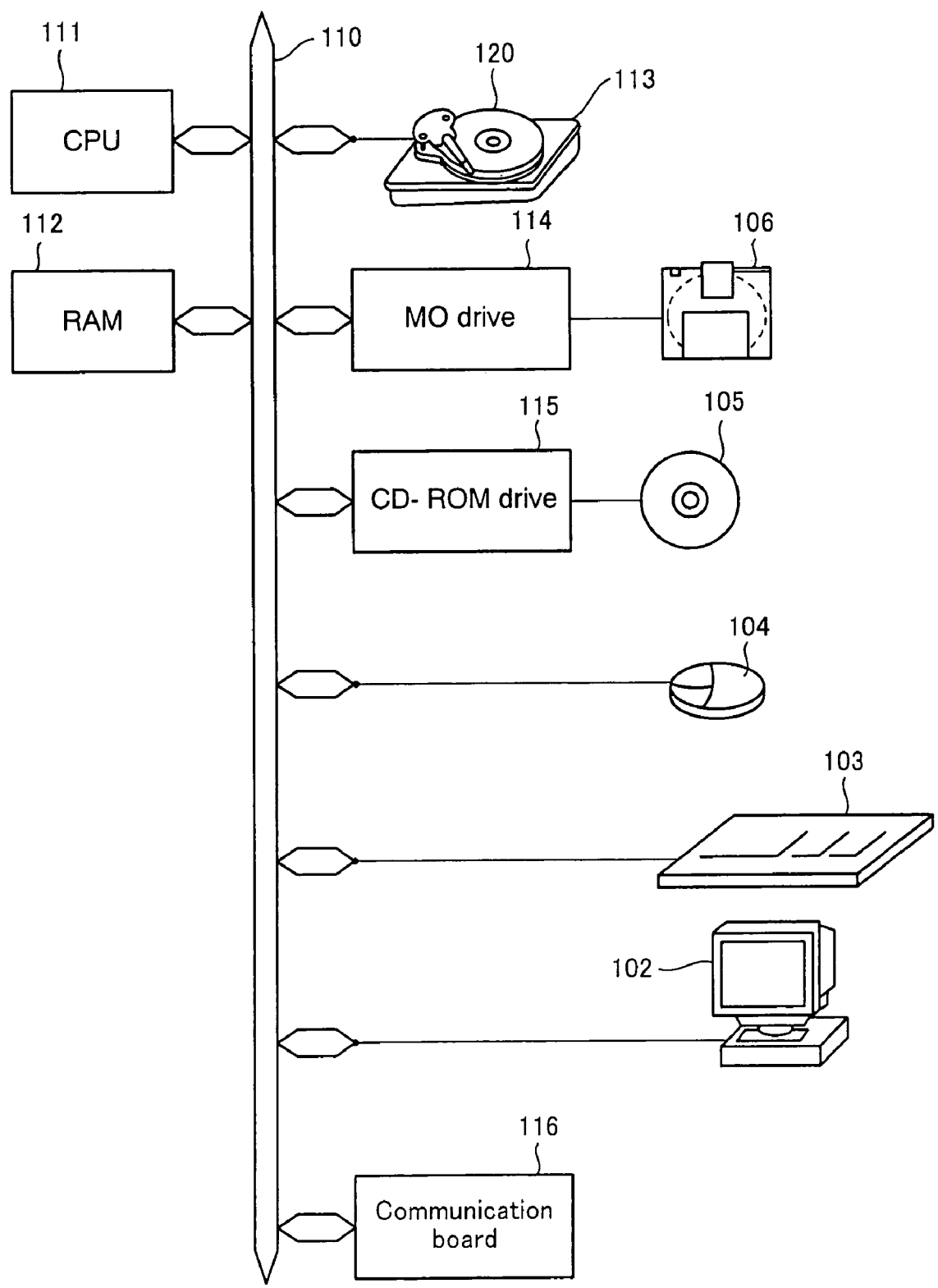
FIG. 3 shows a hardware configuration of a computer serving as a data converter.

FIG. 3 shows a hardware configuration of the computer serving as the data converter 100.

Referring to this drawing, there are shown a central processing unit (CPU) 111, a RAM 112, a hard disk drive (HDD) 113, an MO drive 114, a CD-ROM drive 115 and a communication board 116, which are interconnected via a bus 110.

The HDD 113 incorporates a hard disk 120, which is a kind of recording medium, and information is recorded on or reproduced from the hard disk 120.

The communication board 116 is connected to a communication line, such as a local area network (LAN). The data converter 100 shown in FIG. 1 can transmit data to or receive data from another computer and output image data to the printer 200 by being connected to the communication network 250 via the communication board 116.

In addition, FIG. 3 shows the mouse 104, the keyboard 103 and the CRT display 102 shown also in FIG. 1, which are connected to the bus 110 via their respective I/O interfaces (not shown).

Here, the CD-ROM 105 is a data conversion program storage medium according to an embodiment of the present invention, which stores a data conversion program. The CD-ROM 105 is loaded into the main unit 101, and the data conversion program stored in the CD-ROM 105 is read by the CD-ROM drive 115 and installed in the hard disk 120 via the bus 110.

When the data conversion program installed in the hard disk 120 is activated, the data conversion program is loaded from the hard disk 120 to the RAM 112 and executed by the CPU 111. Once the data conversion program according to the present invention is activated and executed, the computer system 100 operates as the image data converter according to an embodiment of the present invention. That is, a combination of a computer and a data conversion program according to the present invention constitutes an image data converter according to an embodiment of the present invention.

Figure 4:
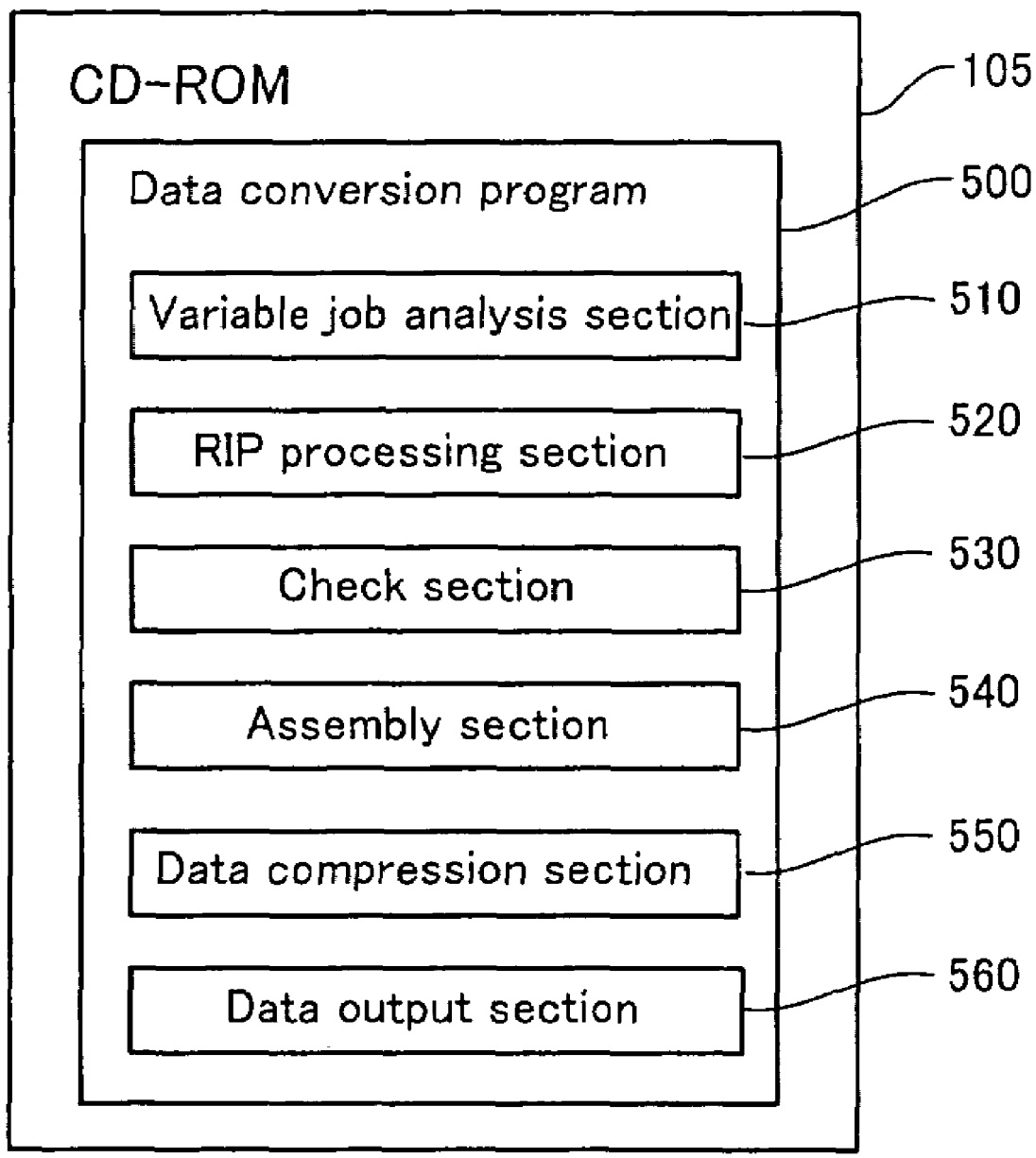
FIG. 4 shows a data conversion program storage medium according to an embodiment of the present invention.

FIG. 4 shows a data conversion program storage medium according to an embodiment of the present invention. Here, a data conversion program 500 is stored in the CD-ROM 105.

The data conversion program 500 is executed in a computer to make the computer operate as the data converter 100 shown in FIG. 1. The data conversion program 500 has a variable job analysis section 510, an RIP processing section 520, a check section 530, an assembly section 540, a data compression section 550 and a data output section 560.

The components of the data conversion program 500 will be described in detail later.

Figure 5:
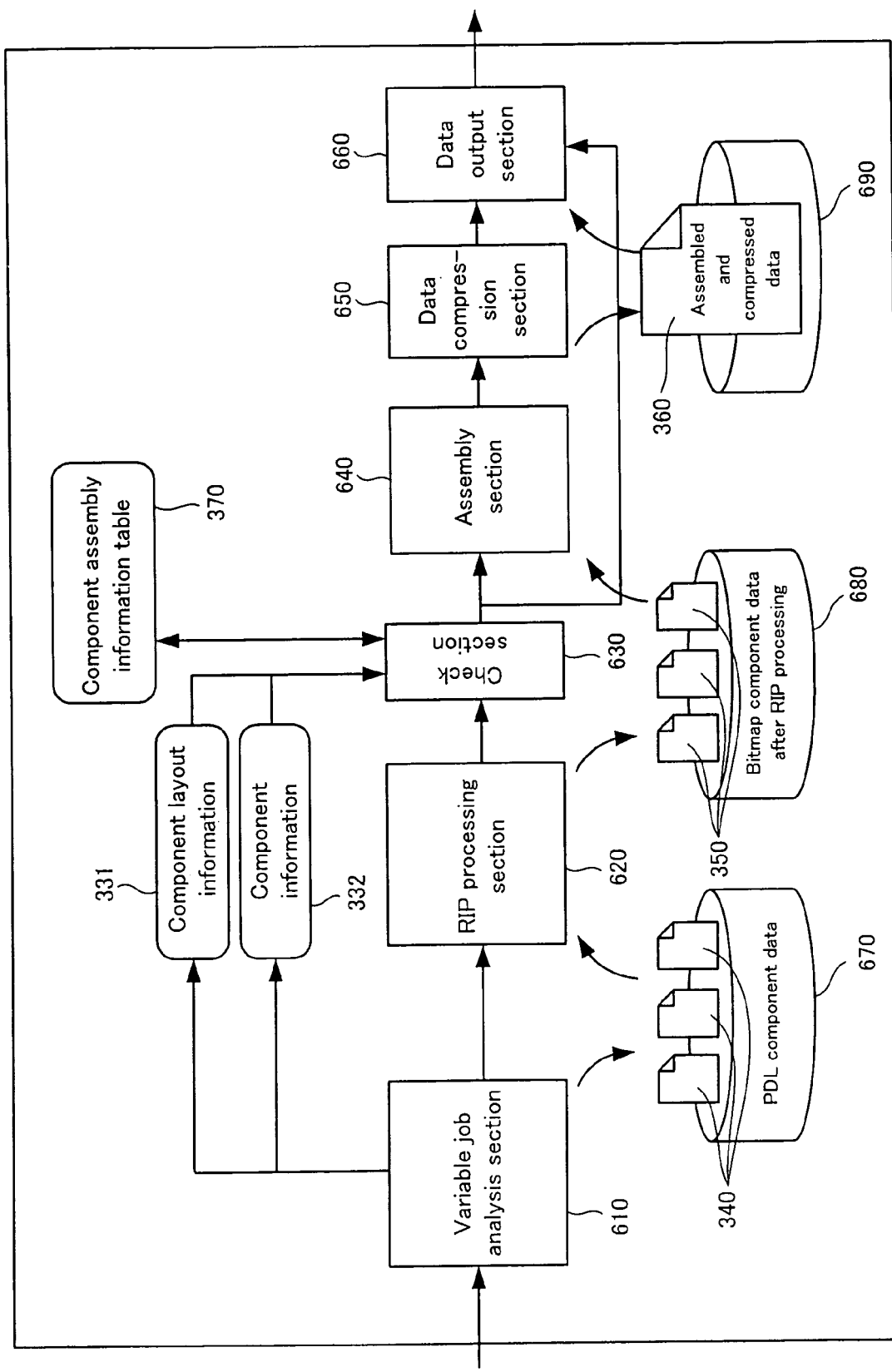
FIG. 5 is a functional block diagram of the data converter shown in FIG. 1.

FIG. 5 is a functional block diagram of the data converter 100 shown in FIG. 1.

The data converter 100 is implemented by a computer with the data conversion program 500 shown in FIG. 4 installed and executed therein.

The data converter 100 has a variable job analysis section 610, an RIP processing section 620, a check section 630, an assembly section 640, a data compression section 650 and a data output section 660. In addition, the data converter 100 has a PDL component data storage section 670, a bitmap component data storage section 680, and a to-be-output compressed data storage section 690.

Of the components, the variable job analysis section 610, the RIP processing section 620, the assembly section 640 and the data compression section 650 constitute an example of a data conversion section according to the present invention. The check section 630 is an example of a sharing determination section according to the present invention, the data compression section 650 serves also as an example of a data saving section according to the present invention, and the data output section 660 serves also as a data sharing section according to the present invention.

The variable job analysis section 610, the RIP processing section 620, the check section 630, the assembly section 640, the data compression section 650 and the data output section 660 are implemented in the computer by the variable job analysis section 510, the RIP processing section 520, the check section 530, the assembly section 540, the data compression section 550 and the data output section 560 of the data conversion program 500 shown in FIG. 4, respectively. These components of the data converter 100 shown in FIG. 5 correspond to the components of the data conversion program 500 shown in FIG. 4. However, while the components shown in FIG. 5 are implemented by combinations of the hardware of the computer and the OS or application programs executed in the computer, the components of the data conversion program shown in FIG. 4 are implemented by only application programs.

Here, the hard disk drive (HDD) 113 shown in FIG. 2 or the like serves as the PDL component data storage section 670 in FIG. 5, the bitmap component data storage section 680 and the to-be-output compressed data storage section 690.

In the following, the components of the data converter 100 shown in FIG. 5 will be described, and the description applies also to the components of the data conversion program 500 shown in FIG. 4.

Processings performed by the data converter 100 can be generally separated into two stages, the first half and the second half. In the first half stage, an RIP processing for producing a raster image of each component is primarily performed, and in the second half stage, an arrangement (assembly) processing for arranging the raster images of the components in a page is primarily performed.

First, processings of the first half stage will be described.

The variable job analysis section 610 obtains image group data in a PDL format described above, analyzes each component of plural versions of prints involved in one job represented by the image group data, assigns a management ID number to each analyzed component, and creates component information 332 that indicates the color of each component, the classification of each component as a continuous-tone component or line-work component, or the like. In addition, the variable job analysis section 610 analyzes the arrangement (layout) of components in each page of the prints and creates component layout information 331 that indicates the analyzed layout. Furthermore, the variable job analysis section 610 extracts a data section that describes the structure of each component from the image group data, associates the data section with a management ID number, and stores the data section in the PDL component data storage section 670 as a component data 340 in the PDL format.

Once the variable job analysis section 610 completes the processings described above, the RIP processing section 620 then performs an RIP processing on each piece of component data 340 in the PDL component data storage section 670 to produce a raster image of each component and stores component data 350, which is the raster image converted into a bitmap format, in the bitmap component data storage section 680.

Figure 6:
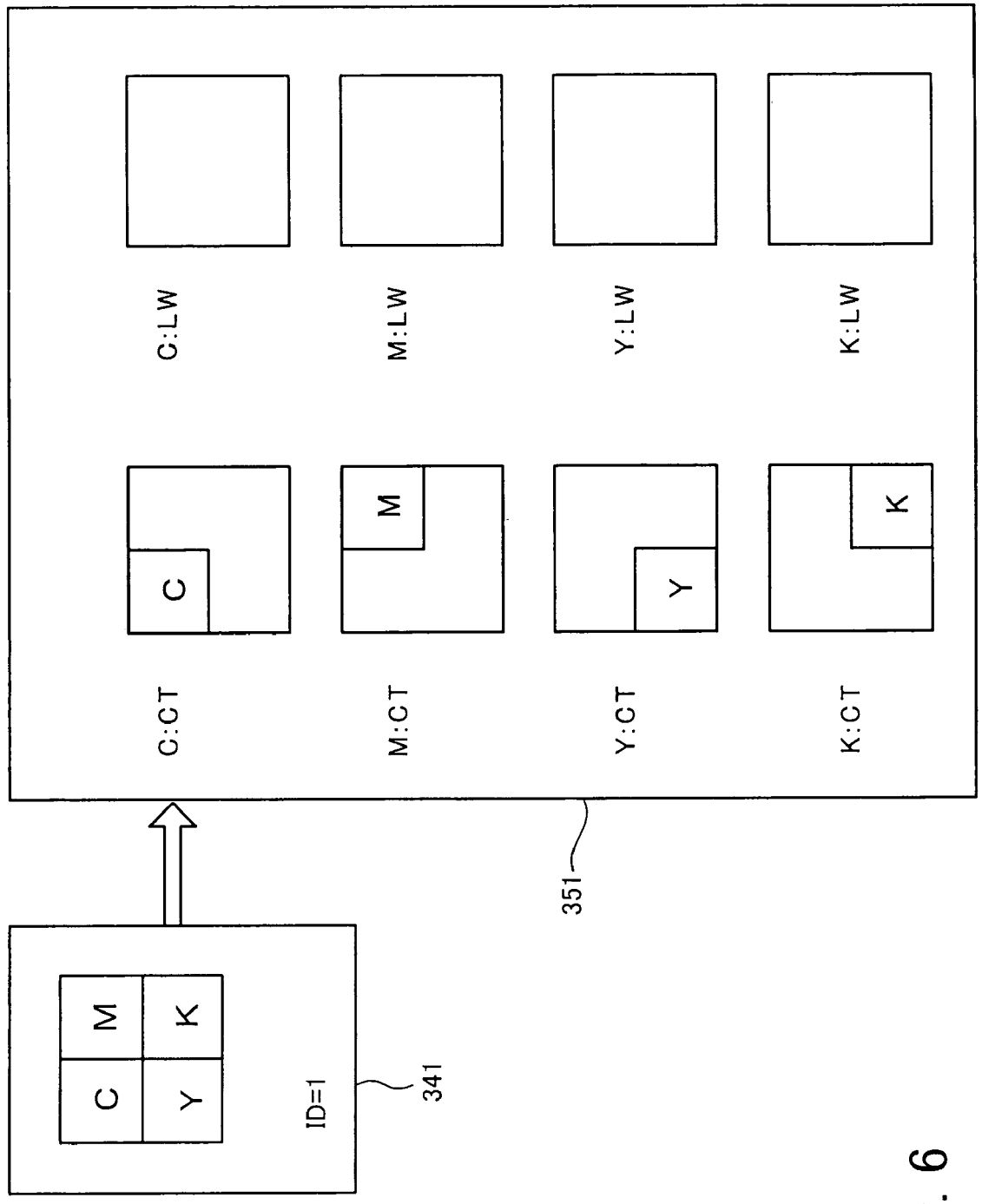
FIG. 6 is a diagram illustrating an RIP processing performed on a first component.

FIG. 6 is a diagram illustrating the RIP processing performed on the first component.

FIG. 6 shows first component data 341 in the PDL format and first component data 351 in the bitmap format as component data associated with the first component 321 shown in FIG. 2.

As described above, the first component 321 shown in FIG. 2 is a continuous-tone component. In addition, the first component 321 is composed of four colors of C, M, Y and K. The first component data 341 in the PDL format describes such a configuration and is assigned with an ID number of "1".

Once the RIP processing is performed on a piece of component data, the image of the component is developed into four, C, M, Y and K, raster images of continuous tone (CT) and four, C, M, Y and K, raster images of line work (LW).

In the case where the RIP processing is performed on the first component data 341 in the PDL format, since the first component is a continuous-tone component and is composed of the four colors of C, M, Y and K, the first component data 351 in the bitmap format includes a C-color continuous-tone (C:CT) raster image, an M-color continuous-tone (M:CT) raster image, an Y-color continuous-tone (Y:CT) raster image, and a K-color continuous-tone (K:CT) raster image. As for the remaining four raster images, that is, a C-color line-work (C:LW) raster image, an M-color line-work (M:LW) raster image, an Y-color line-work (Y:LW) raster image, and a K-color line-work (K:LW) raster image, no raster image is produced.

Figure 7:
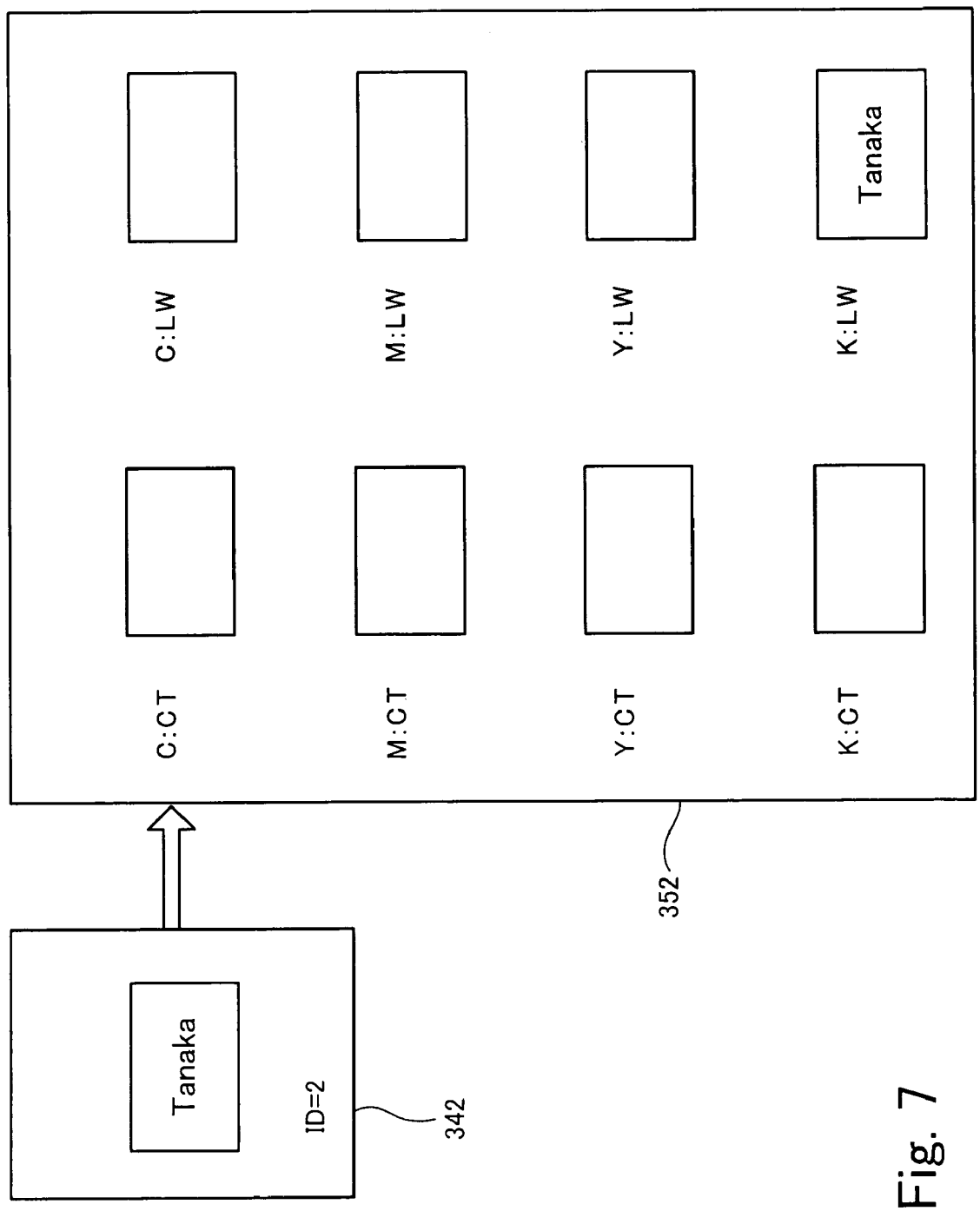
FIG. 7 is a diagram illustrating an RIP processing performed on a second component.

FIG. 7 is a diagram illustrating the RIP processing performed on the second component.

FIG. 7 shows second component data 342 in the PDL format and second component data 352 in the bitmap format as component data associated with the second component 322 shown in FIG. 2.

As described above, the second component 322 shown in FIG. 2 is a line-work component. In addition, the second component 322 is composed of only the K color. The second component data 342 in the PDL format describes such a configuration and is assigned with an ID number of "2".

In the case where the RIP processing is performed on the second component data 342 in the PDL format shown in FIG. 7, since the second component is a line-work component and is composed of only the K color, the second component data 352 in the bitmap format includes only a K-color line-work (K:LW) raster image, and the other seven raster images are not produced.

The component data representing the raster images described with reference to FIGS. 6 and 7 are produced in the processings of the first-half stage by the data converter 100 shown in FIG. 5 and stored in the bitmap component data storage section 680.

Now, processings of the second half stage performed by the data converter 100 will be described.

In the processings of the second half stage, components are arranged in a page of a print, and eight raster images forming one page are produced.

Figure 8:
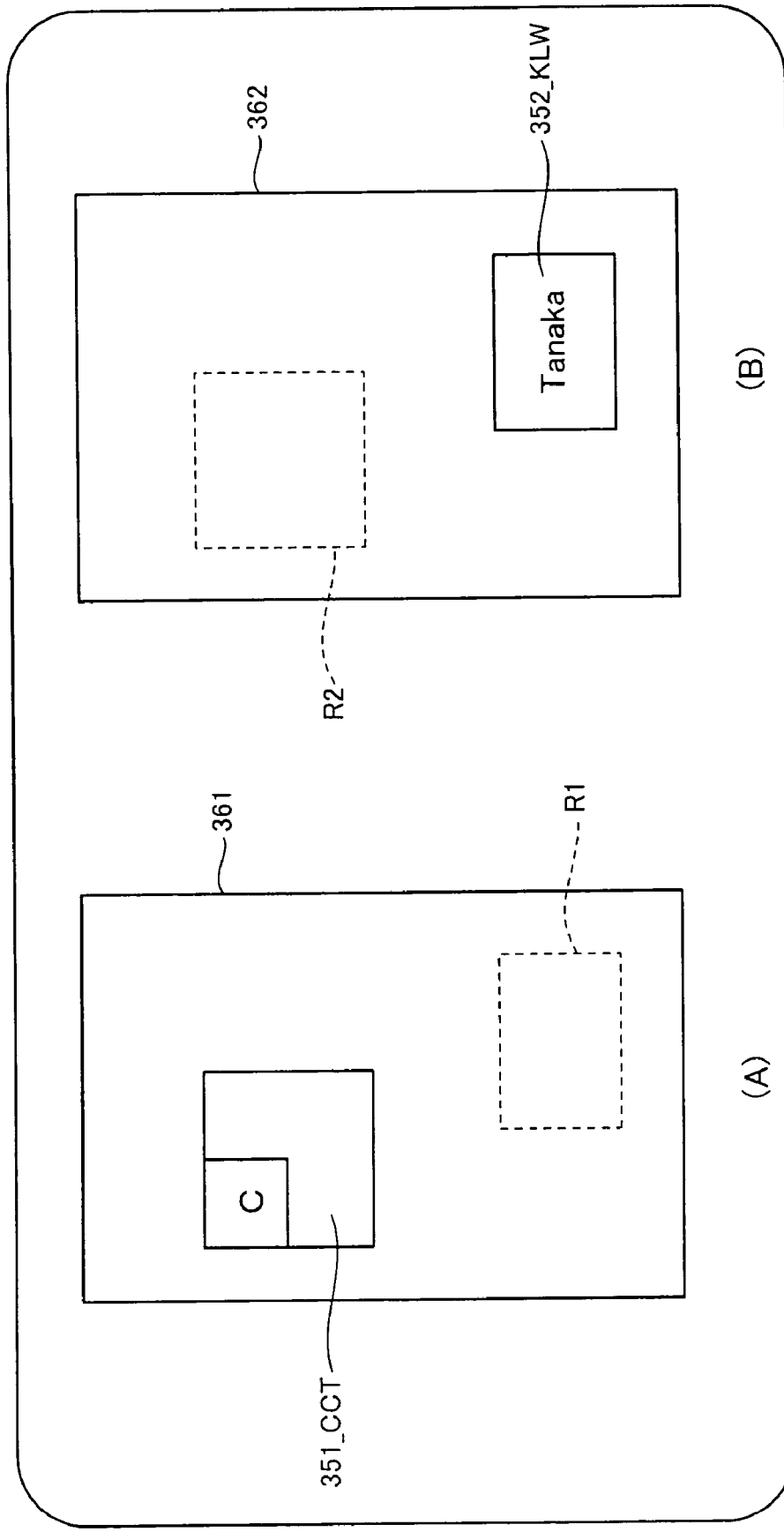
FIG. 8 is a conceptual diagram showing raster images produced in processings of a second half stage.

FIG. 8 is a conceptual diagram showing raster images produced in the processings of the second half stage.

FIG. 8 shows raster images for outputting the first print 320_1 shown in FIG. 2. Part (A) of FIG. 8 shows a C-color continuous-tone raster image 361 of the eight raster images, and part (B) of FIG. 8 shows a K-color line-work raster image 362.

The first print 320_1 shown in FIG. 2 is composed of the first component 321 and the second component 322. Since the first component 321 is a continuous-tone component, and the second component 322 is a line-work component, the raster image 361 shown in part (A) of FIG. 8 is composed of a C-color continuous-tone raster image 351_CCT in the first component data in the bitmap format arranged in a page and contains nothing in a region R1 corresponding to the second component. On the other hand, the raster image 362 shown in part (B) of FIG. 8 is composed of a K-color line-work raster image 352_KLW in the second component data in the bitmap format arranged in a page and contains nothing in a region R2 corresponding to the first component.

Here, replacement of a component in the variable printing will be considered. For example, in the case where the second component 322 in the first print 320_1 shown in FIG. 2 is replaced with the third component 323 to provide the second print 320_2, since the K-color line-work raster image 362 shown in part (B) of FIG. 8 contains the raster image 352_KLW derived from the second component, the K-color line-work raster image 362 has to be reconfigured for the new print. On the other hand, since the C-color continuous-tone raster image 361 shown in part (A) of FIG. 8 contains only the raster image 351_CCT derived from the first component, the raster image 361 output for the first print can be used as it is when outputting the second print. Thus, according to this embodiment, since the raster image once produced can be shared, the processing load can be reduced.

In the following, referring to flowcharts and FIG. 5, processings of the second half stage performed by the data converter 100 shown in FIG. 5 will be described in detail.

Figure 9:
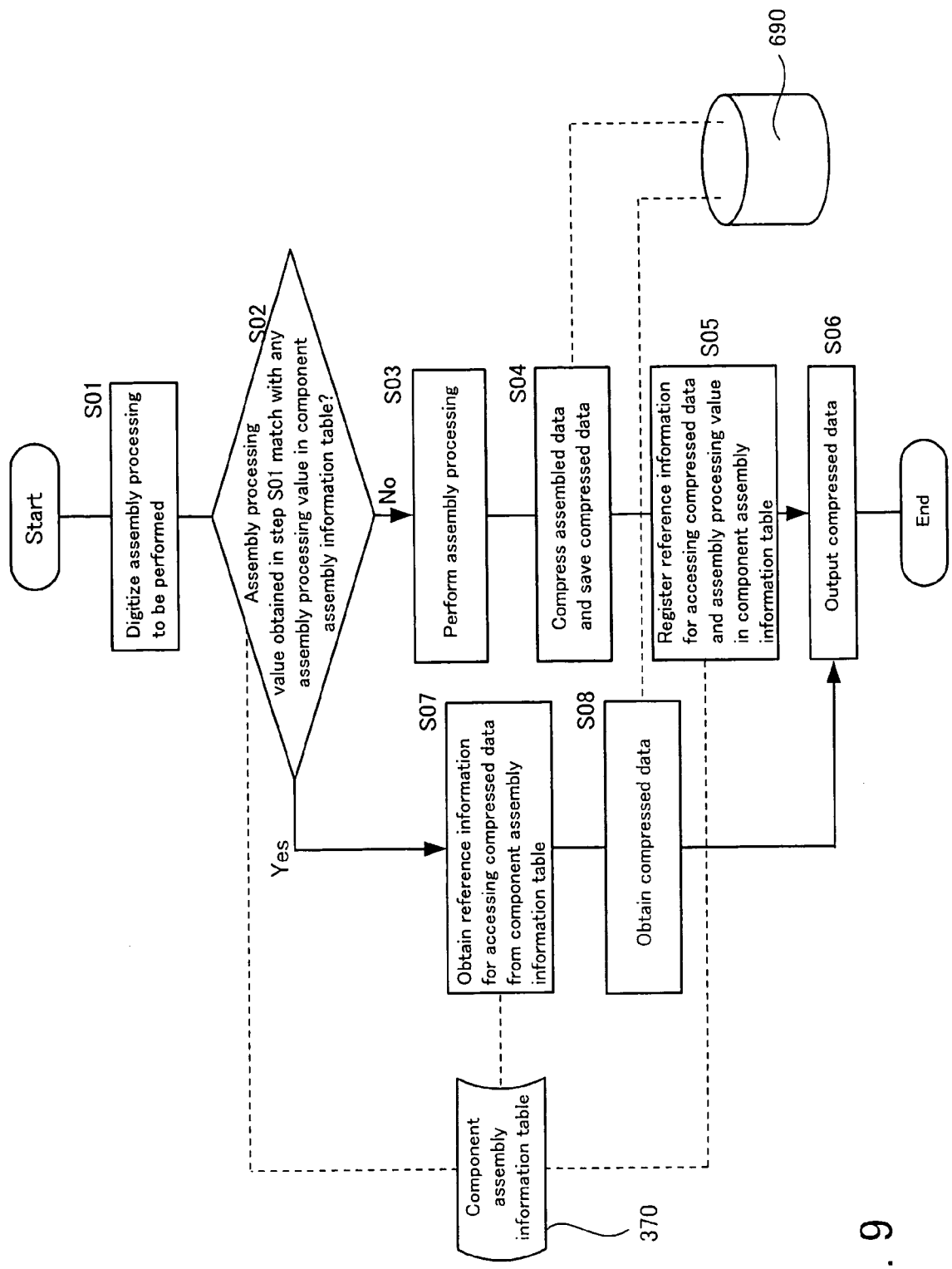
FIG. 9 is a flowchart illustrating processings of the second half stage.

FIG. 9 is a flowchart illustrating processings of the second half stage.

The process shown in this flowchart is performed when each of the eight raster images forming one page is produced.

Once the process is started, first, the check section 630 shown in FIG. 5 digitizes an assembly processing to be performed based on the component layout information 331 and the component information 332, thereby obtaining an assembly processing value that can identify the raster image to be obtained by the assembly processing (step S01 in FIG. 9). The assembly processing value, which is a kind of hash value, is a tens-digits positive integral value that is uniquely determined by the relevant component of the raster image and the arrangement thereof. Equal assembly processing values mean that the resulting raster images are the same. Using such an assembly processing value enables simple and quick comparison between the raster image already produced and the raster image yet to be obtained.

Then, the check section 630 shown in FIG. 5 compares the assembly processing value thus obtained against the assembly processing values recorded in a component assembly information table 370 as described later (step S02 in FIG. 9). Then, if the component assembly information table 370 contains no assembly processing value equal to the obtained one, the assembly section 640 shown in FIG. 5 arranges, in the page, the raster image of the component represented by the component data 350 stored in the bitmap component data storage section 680 based on the component layout information 331 (step S03 in FIG. 9). Then, the data compression section 650 shown in FIG. 5 performs data compression of the data representing the raster image of the page for reducing the duration of output to the printer 200 shown in FIG. 1, and the compressed data 360 is retained in the to-be-output compressed data storage section 690 as shown in FIG. 5 (step S04 in FIG. 9). The compressed data is an example of plate data according to the present invention. In addition, reference information used to access the compressed data 360 in the to-be-output compressed data storage section 690 is recorded in the component assembly information table 370 along with the assembly processing value (step S05 in FIG. 9).

FIG. 10 shows a component assembly information table.

In the component assembly information table 370, there are recorded pairs of an assembly processing value 371 and reference information 372 for accessing the compressed data representing the raster image identified by the assembly processing value 371. Each row in the table corresponds to one of the eight raster images forming one page. The component assembly information table 370 is prepared for each of the eight kinds of raster images forming each page of a print. In the comparison in step S02 shown in FIG. 9, a table suitable for the kind of the raster image to be produced is referred to.

Once the assembly processing value and the reference information is recorded in the component assembly information table in step S05 in FIG. 9, the data output section 660 shown in FIG. 5 outputs the compressed data 360 to the printer 200 shown in FIG. 1 (step S06 in FIG. 9), and then, the process shown in FIG. 9 ends.

On the other hand, if an assembly processing value equal to the obtained one is found in the component assembly information table 370, the data output section 660 shown in FIG. 5 obtains the reference information from the component assembly information table 370 (step S07 in FIG. 9), obtains the compressed data 360 from the to-be-output compressed data storage section 690 (step S08 in FIG. 9), and outputs the compressed data 360 to the printer 200 shown in FIG. 1 (step S06 in FIG. 9). That is, in this case, the compressed data that represents the assembly-processed raster image is used as it is. Therefore, the assembly processing and the compression processing are omitted, and the processing load is reduced. As a result, as a whole, raster images can be rapidly produced in the job.

Here, in the above description, the printer that receives eight pieces of data that represent eight raster images including four, C, M, Y and K, continuous-tone raster images and four, C, M, Y and K, line-work raster images is shown as an example of the output device according to the present invention. However, the output device according to the present invention may be one that outputs an image by receiving four pieces of plate data that represent four, C, M, Y and K, raster images, or one that outputs an image by receiving three pieces of plate data that represent three, C, M and Y, or R, G and B, raster images. Furthermore, the output device according to the present invention may be one that outputs an image by receiving plate data that represents a plate image in a form other than the raster image.

In addition, in the above description, the image group data in which each component is declared a master component or a variable component is shown as an example of the image group data according to the present invention. However, the image group data according to the present invention may be data that simply represents the components arranged in each page without such discrimination, or data that simply represents the image of each page without regard for component. Furthermore, of course, the data format of the image group data and the plate data according to the present invention is not limited to that of the image group data and the compressed data illustrated in the above description.

Furthermore, in the above description, the sections that performs data conversion of image data through plural processing steps is shown as an example of the data conversion section according to the present invention. However, the data conversion section according to the present invention may be one that completes data conversion only in one step.

Furthermore, in the above description, the check section that performs simple and quick check using the assembly processing value is shown as an example of a sharing determination section according to the present invention. However, the sharing determination section according to the present invention may be one that performs direct comparison of plate data.

Furthermore, in the embodiments described above, the CD-ROM is shown as an example of the data conversion program storage medium according to the present invention. However, the data conversion program storage medium according to the present invention may be any kind of storage medium that can store a program. For example, a magnetic disk of a hard disk device, a flexible disk (FD), an MO disk, a DVD, or a card-type or tape-type storage medium may be used.

What is claimed is:

1. A data converter that converts image group data representing an image group consisting of a plurality of images into image data in a data format suitable for a predetermined output device that outputs an image, comprising:

a data conversion section that produces plate data in the data format by converting the image group data into the plate data, each piece of plate data representing a plate image, and a plurality of pieces of plate images being overlapped each other to represent each of the images in the image group represented by the image group data;

a data saving section that saves the plate data produced by the data conversion section in a predetermined retaining location;

a sharing determination section that determines whether plate data saved by the data saving section can be shared or not before the production of the plate data by the data conversion section is completed; and a data sharing section that, if the sharing determination section determines that plate data can be shared, acquires the plate data from the data saving section while preventing the data conversion section from producing plate data.

2. The data converter according to claim 1, wherein the data conversion section produces plate data through a plurality of data conversion steps, and the sharing determination section determines whether plate data can be shared or not when at least the last one of the plurality of data conversion steps has not been conducted.

3. The data converter according to claim 1, wherein the image group data represents an image group that constitutes a plurality of versions of prints having a common part.

4. The data converter according to claim 1, wherein the plurality of pieces of plate images correspond to images of different colors.

5. The data converter according to claim 1, wherein the plurality of pieces of plate images correspond to images of four colors.

6. The data converter according to claim 5, wherein the four colors include cyan, magenta, yellow and black.

7. The data converter according to claim 1, wherein the plate data is saved in a bit map format.

8. A data conversion program storage medium that stores a data conversion program that is incorporated in a computer and makes the computer convert image group data representing an image group consisting of a plurality of images into image data in a data format suitable for a predetermined output device that outputs an image, the data conversion program implementing on the computer:

a data conversion section that produces plate data in the data format by converting the image group data into the plate data, each piece of plate data representing a plate image, and a plurality of pieces of plate images being overlapped each other to represent each of the images in the image group represented by the image group data;

a data saving section that saves the plate data produced by the data conversion section;

a sharing determination section that determines whether plate data saved by the data saving section can be shared or not before the production of the plate data by the data conversion section is completed; and a data sharing section that, if the sharing determination section determines that plate data can be shared, acquires the plate data from the data saving section while preventing the data conversion section from producing plate data.

* * * * *